(12) United States Patent
Gallant et al.

(10) Patent No.: US 7,529,359 B2
(45) Date of Patent: May 5, 2009

(54) CALLER TREATMENT IN A SIP NETWORK

(75) Inventors: John K. Gallant, Plano, TX (US); Kathleen A. McMurray, Richardson, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 755 days.

(21) Appl. No.: 10/097,748

(22) Filed: Mar. 15, 2002

(65) Prior Publication Data

US 2002/0150226 A1    Oct. 17, 2002

Related U.S. Application Data

(60) Provisional application No. 60/276,923, filed on Mar. 20, 2001, provisional application No. 60/276,954, filed on Mar. 20, 2001, provisional application No. 60/276,955, filed on Mar. 20, 2001, provisional application No. 60/276,953, filed on Mar. 20, 2001.

(51) Int. Cl.
*H04M 3/42* (2006.01)
*H04M 1/56* (2006.01)
*H04M 15/06* (2006.01)

(52) U.S. Cl. ............................ 379/210.02; 379/142.01; 379/201.01

(58) Field of Classification Search ............ 379/210.02, 379/114.05, 196, 218.01, 211.02, 201.01, 379/207.13, 142.05, 142.01; 370/352, 260
See application file for complete search history.

(56) References Cited

U.S. PATENT DOCUMENTS

| 5,859,900 A | 1/1999 | Bauer et al. |
| 5,991,291 A | 11/1999 | Asai et al. |
| 6,009,150 A | 12/1999 | Kamel |
| 6,137,869 A | 10/2000 | Voit et al. |
| 6,148,070 A | 11/2000 | Meek et al. |
| 6,327,357 B1 * | 12/2001 | Meek et al. ............ 379/218.01 |
| 6,516,057 B2 * | 2/2003 | Meek et al. ................. 379/196 |
| 6,584,183 B2 * | 6/2003 | Manto .................... 379/114.05 |
| 6,671,262 B1 * | 12/2003 | Kung et al. ................. 370/260 |
| 6,680,935 B1 * | 1/2004 | Kung et al. ................. 370/352 |
| 6,731,736 B2 * | 5/2004 | Meek et al. ............ 379/211.02 |
| 7,006,455 B1 * | 2/2006 | Fandrianto et al. .......... 370/260 |
| 2004/0174974 A1 * | 9/2004 | Meek et al. ............ 379/210.02 |

OTHER PUBLICATIONS

J. Rosenberg et al. "*SIP: Session Initiation Protocol*", Feb. 27, 2002, 194 pages.

* cited by examiner

*Primary Examiner*—Thjuan K Addy

(57) ABSTRACT

In a SIP network, SIP servers are provisioned with information used to authenticate subscribers and entities that will be placing calls. This information can be used during call establishment to allow or deny calls, as well as to determine the appropriate party to bill if the call involves a charge, such as a long distance charge. In addition to allowing calls between authenticated and trusted entities, there is a need for the SIP server to allow certain kinds of calls that involve non-trusted users or entities. If non-trusted entities where not recognized, trusted users and entities within the SIP network would not be able to receive calls from users or entities not know to the SIP server that is providing them services.

25 Claims, 2 Drawing Sheets

CALLER TREATMENT IN A SIP NETWORK

RELATED APPLICATION DATA

This application claims the benefit of and priority under 35 U.S.C. §119(e) to U.S. patent application Ser. Nos. 60/276,923, 60/276,953, 60/276,954, and 60/276,955, all filed Mar. 20, 2001, and all of which are incorporated herein by reference in their entirety.

BACKGROUND OF THE INVENTION

1. Field of the Invention

The present invention general relates to communication services, and more particularly, to the handling of a caller in a SIP network.

2. Description of Related Art

The proliferation of data transport networks, and most notably the Internet, is revolutionizing telephony and other forms of real-time communications. Businesses that have become accustomed to having telephony traffic and data traffic separately supported over different systems and networks are now moving toward a converged network where telephone voice traffic and other forms of real-time media are converted into digital form and carried by a packet data network along with other forms of data. Now that technologies are feasible to support packet based networking, voice over data transport offers many advantages in terms of reduced capital and operating cost, resource efficiency and flexibility.

For example, at commercial installations, customer equipment investments are substantially reduced as most of the enhanced functions, such as PBX and automatic call distribution functions, may reside in a service provider's network. Various types of gateways allow for sessions to be established even among diverse systems such IP phones, conventional analog phones and PBXs as well as with networked desktop computers.

To meet the demand for voice over data transport, service providers and network equipment vendors are faced with the challenges of establishing new protocols and standards, recognizing new business models, implementing new strategies and designing new equipment in a way that would have been difficult to imagine twenty years ago.

For example, a new generation of end-user terminal devices are now replacing the traditional telephones and even more recently PBX phone sets. These new sets, such as those offered by Cisco Systems Incorporated and Pingtel Corporation, may connect directly to a common packet data network, via, for example, an ethernet connection, and feature large visual displays to enhance the richness of the user interface.

Even before such devices were deployed, computers equipped with audio adapters and connected to the Internet were able to conduct some rudimentary forms of Internet telephony, although the quality was unpredictable and often very poor. The current trend is to focus upon adapting Internet protocol (IP) networks and other packet based transport networks to provide reliable toll-quality connections, easy call set-up and enhanced features to supply full-feature telephony as well as other forms of media transport. Some other types of media sessions enabled by such techniques may include video, high quality audio, multi-party conferencing, messaging, collaborative applications, and the like.

Of course, as a business or residential communications subscriber begins using such voice-over-packet communications to replace conventional telephony, there will naturally be an expectation that the quality of the communications and the variety of services will be at least as good as in the former telephone network. In terms of services, for example, some businesses have come to rely upon PBX features or network-resident "Centrex" features such as call forwarding and conditional call handling. Such special features are expected to see increased use because the new terminal devices mentioned earlier can provide a much more intuitive interface for users. With existing systems, users often forget which combination of keystrokes are required to evoke the enhanced features.

For establishing a communications session in a network, new protocols and control architectures have emerged. It is worth noting that these protocols and architectures have been inspired by the migration to a voice over data type topology but are not necessarily limited to such an environment. The protocols and control architectures as described hereinafter may be used to establish calls through any form of transport.

Both the ITU H.323 standard and the IETF's Session Initiation Protocol (SIP) are examples of protocols which may be used for establishing a communications session between terminals connected to a network. The SIP protocol is described in ITF document REC 2543, and its successors, all of which are incorporated herein by reference in their entirety, respectively. Various architectures have been proposed in conjunction with these protocols with a common theme of having an address resolution function, referred to as "location server," which is located in the network and which maintains current information on how to reach any destination and to control features on behalf one or more users.

For large-scaled deployment of voice-over-data transport as well as other real-time communications, it is essential that the network control architectures be robust and highly scaleable to reliably accommodate millions of sessions on a daily basis. Robustness may necessitate designing in redundancy and may also include failover mechanisms. Preferably, these measures will even provide transparent continuity of existing sessions and features even if a failure occurs in the midst of a session. For insuring this level of reliability and for maximizing scaleability, it is generally preferable to minimize the demand upon control functions, such a location servers, to maintain persistent state information for each call in the network.

In general, session initiation protocol (SIP) is an application-layer control protocol that is capable of creating, modifying and terminating sessions between one or more participants. These sessions can include, for example, Internet telephone calls, multimedia distribution, multimedia conferences, voice-over IP, or the like.

The SIP invitations that are used to create sessions carry session descriptions that allow participants to agree on a set of one or more compatible media types. SIP utilizes proxy servers to help route requests to the user's current location, authenticate and authorize users for one or more services, implement provider call-routing policies, and to provide additional features and advanced features to users. SIP also provides a registration function which allows users to identify their current location which then can be used by the proxy server.

A session is an exchange of data between an association of participants. Numerous applications on the Internet, such as real-time distributed network communications, require the creation, management and maintenance of one or more sessions. However, the implementation of these applications is complicated by the practices of participants, e.g., the participants may move between physical locations, the participants may be addressable by a plurality of identifiers, and the participants may communicate using several types of communications media, sometimes in parallel. Many protocols have been developed to transport various forms of real-time multimedia session data, such as voice, video or text messages. SIP works in concert with these protocols by enabling Internet endpoints, i.e., user agents, to locate one another and to reconcile aspects of a session to be shared. For locating perspective session participants, and for other functions, SIP enables the creation of an infrastructure of network hosts, i.e., proxy servers, to which user agents can send registrations, invitations to sessions, other requests, and the like. Therefore, SIP provides a mechanism for creating, modifying and terminating sessions that is capable of working independently of the underlining transport protocols and without a dependence on the type of session.

As discussed above, SIP is an application-layer control protocol that is capable of establishing, modifying and terminating multi-media sessions. These sessions can include, Internet telephony calls, multimedia exchanges, or the like. SIP is also capable of inviting participants to already existing sessions, such as multicast conferences. Media can be added to and removed from existing sessions at any point and time during the session. Furthermore, SIP can transparently support name mapping and redirection services which allow a user to maintain a single externally visible identifier while moving to numerous locations within one or more networks.

Specifically, SIP is a component that can be used in conjunction with other IETF protocols that are combined to create a complete multimedia architecture. Typically these architectures will include protocols such as the real-time transport protocol (RTP) for transporting real-time data and providing quality of service feedback, the real-time streaming protocol that controls delivery of streaming media, the media gateway control protocol that controls gateways to the public switched telephone network, the session description protocol that describes multimedia sessions, and the like. Therefore, SIP can be used in conjunction with other protocols in order to provide complete services to one or more users thus enabling the basic functionality of SIP to work with any protocol, and not be dependent thereon.

Likewise, SIP provides primitives that can be used to implement a plurality of services. For example, SIP can locate a user and deliver an object to that users currently registered location. If this primitive is used to deliver a session description, the endpoints can agree on the parameters of the session and if the same primitive is used to delivery other information related to the caller, as well as the session description, a caller ID type of service could be implemented. Thus, a single primitive can typically be used to provide several different services.

SUMMARY

In a SIP network, SIP servers are provisioned with information used to authenticate subscribers and entities that will be placing calls. This information can be used during call set-up to allow or deny calls, as well as to determine the appropriate party to bill if the call involves a charge, such as a long distance charge. In addition to allowing calls between authenticated and trusted entities, there is a need for the SIP server to allow certain kinds of calls that involve non-trusted users or entities. If non-trusted entities were not recognized, trusted users and entities within a SIP network would not be able to receive calls from users or entities not known to the SIP server that is providing them services.

Therefore, the SIP server must be able to distinguish between trusted and/or authenticated users and non-trusted callers. Once this distinction has been made, the SIP server can implement different call processing logic for calls that involve authenticated and/or trusted users and those that involve non-trusted users. For example, a non-trusted caller can call a trusted user, if the trusted user selects this as a feature, but can't make calls that would involve a charge, such as a long distance call(s).

The authentication of users placing calls can occur in the SIP server and thus the exchanging of information about the user name and password of the user in a secure fashion. The initial request to place a call by the user normally would not contain any authentication information. The SIP server responds with a challenge response that contains the "realm" of the SIP server and a seed to be plugged into an authentication algorithm along with a user name, password and other related information. The user than re-sends the request with the result of the algorithm to the SIP server. The SIP server then validates the request sent by the user to ensure that the user has the valid credentials to make a call, and is thus a trusted and authenticated user.

This authentication sequence is only valid for users that are served by the SIP server through which they are placing a call. If the user is placing a call through a SIP server which does not serve him/her, the SIP server will not have the correct user name and/or password needed to authenticate the user placing the call to the SIP server, and should thus be treated as a non-trusted caller. Therefore, the SIP server needs the ability to determine whether it serves the user before it sends a challenge requesting authentication information. The SIP server does this by keeping a provisioned list of hosts that it services. The request from the caller contains the host to which it belongs in the host portion of the "From" header in the SIP INVITE message. Therefore, when the SIP server receives and INVITE request, and the host portion of the "From" header is not a host that is served by the server, the request is not challenged, and the call processing logic that is executed is the logic that also applies to non-trusted callers.

Aspects of the present invention relate to a communication services. In particular, aspects of the present invention relate to the handling of particular categories of users in communications systems.

Aspects of the present invention also relate to non-trusted caller treatment in a communications network.

Furthermore, aspects of the present invention relate to the treatment of non-trusted callers in a SIP network.

Aspects of the present invention also relate to the routing and billing of a non-trusted caller in a SIP network.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION

Figure 1:
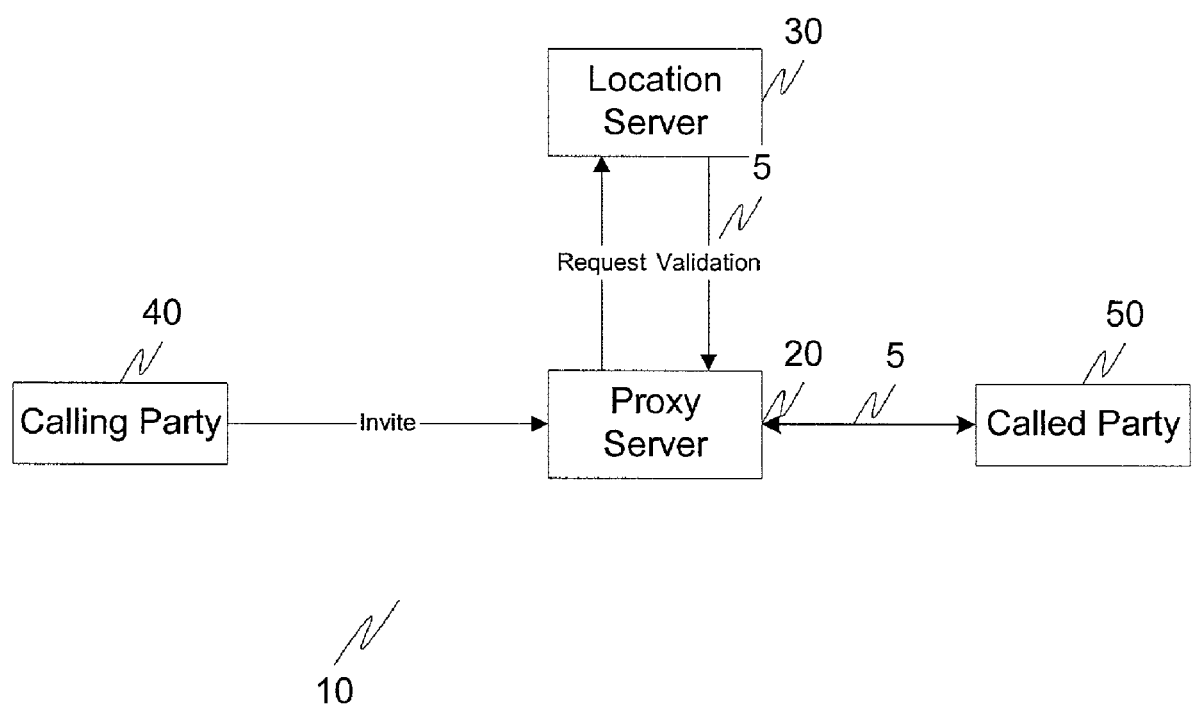
FIG. 1 is a functional block diagram illustrating an exemplary portion of a telecommunications network according to this invention.

The exemplary systems and methods of this invention allow the assessment and routing of non-trusted callers in a SIP network. In particular, and in accordance with an exemplary embodiment of this invention, upon receiving an invite from a calling party, a determination is made as to whether the calling party is a trusted party. If the calling party is a trusted party, the calling party is appropriately routed to a called party. Alternatively, if the calling party is not trusted party, a multi-step determination is made based on the availability of billing information and the communications network serving the calling party as to whether the call should be routed to the called party, or a denial of call returned to the calling party, i.e., the non-trusted caller.

The exemplary systems and methods of this invention will be described in relation to a Session Initiation Protocol (SIP) network. However, to avoid unnecessarily obscuring the present invention, the following description omits well-known structures and devices that may be shown in block diagram form or otherwise summarized. For the purposes of explanation, numerous specific details are set forth in order to provide a thorough understanding of the present invention. It should be appreciated however that the present invention may be practiced in a variety of ways beyond these specific details.

For example, while the present invention will be disclosed in the context of the session initiation protocol and an Internet protocol based network, one of ordinary skill in the art will recognize that the present invention may be generally applicable to other equivalent or analogous communications protocols or communications networks.

Furthermore, it should be appreciated that although SIP-type messages are shown for convenience, any type of protocol or mixture of such protocols may be applied in various parts of the overall system. In particular, the routing requests and responses between the proxy server and the location server may strictly or loosely conform to the SIP protocol or some other standard protocol, or may be proprietary in nature.

As discussed hereinafter, the disclosed communications system may employ SIP to exchange session set-up messages. However, another popular session establishment protocol is referred to in the H.323 protocol, although it is actually a set of related protocols promulgated by the International Telecommunication Union (ITU) for accomplishing multimedia communications. SIP is an alternative standard that has been developed by the Internet Engineering Task Force (IETF). SIP is a signaling protocol that is based on a client-server model, generally meaning that clients evoke required services by messaging requests to servers that can provide the services. Similar to other IETF protocols, such as the simple mail transfer protocol (SMTP) and the hypertext transfer protocol (HTTP), SIP is a textual, human readable protocol.

It may be noted that neither the H.323 or SIP protocols are limited to IP telephony applications, but have applicability to multimedia services in general. In one exemplary embodiment of the present invention, SIP is used to establish telephone calls and other types of sessions through the communications system. However, it will be apparent to those of ordinary skill in the art that the H.323 protocol, with some modifications or extensions, or other similar protocols, could be utilized instead of the SIP protocol. Separate from SIP but often used in conjunction with SIP, is a session description protocol (SDP), which provides information about media streams in the multimedia sessions to permit the recipients of the session description to participate in the session.

The Internet engineering task force's SIP protocol defines numerous types of requests, which are referred to as methods. An important method is the INVITE method, which invites a user to a session. Another method is the BYE request, which indicates that the call may be released. In other words, BYE terminates a connection between two users or parties in a session. Another method is the OPTIONS method. This method solicits information about capabilities without necessarily establishing a call. The REGISTER method may be used to provide information to a SIP server about a user's present locale.

Details regarding the SIP communications protocol and its control services are described in IETF RFC 2543 and IEFT Internet Draft "SIP: Session Initiation Protocol," Feb. 27, 2002, both of which are incorporated herein by reference in their entirety.

FIG. 1 outlines an exemplary portion of a communications network 10 according to this invention. In particular, the communications network 10 comprises a proxy server 20, a location server 30, one or more calling parties 40 and one or more called parties 50, all interconnected by links 5.

While the exemplary embodiments illustrated herein show the various components of the communications network system collocated, it is to be appreciated that the various components of the communications network can be located at distant portions of a distributed network, such as a local area network, a wide area network, a telecommunications network, an intranet and/or the Internet, or within a dedicated communications network. Thus, it should be appreciated that the components of the communications network can be combined into one or more devices or collocated on a particular node of a distributed network, such as a telecommunications network. As will be appreciated from the following description, and for reasons of computational efficiency, the components of the communications network can be arranged at any location within a distributed network without affecting the operation of the system.

Furthermore, it should be appreciated that the various links connecting the elements can be wired or wireless links, or a combination thereof, or any known or later developed element(s) that is capable of supplying and/or communicating data to and from the connected elements.

Additionally, it should be appreciated that while various functional components are illustrated, various other components, such as a SIP conferencing platform, voice mail systems, enterprise gateways, PBX's, network gateways, public switch telephone networks, Data Access Line (DAL) gateways, packet networks, and the like can also be included without affecting the operation of the communications network.

Also, the systems and methods of this invention can be applied with equal success to other types of communications to determine whether a calling party is trusted. For example, other types of communication and communications protocols include voice-over packet, voice-over IP (VoIP), voice-over network, wired or wireless communications systems, such as cellular phones, PDA's, or the like. In general, the systems and methods of this invention will work with any communication system or protocol and will allow for determining whether a calling party is trusted.

In operation, an INVITE is received from a calling party by the proxy server 20. The INVITE message can be, for example, in the form of:
INVITE
RequestURI(a@b)
From(c@d)
Via(d;received=d)
*Proxy-Authorization(userC)* // which may or may
not be present, where, the RequestURI is the called party, "From" is the starting point of the call, "Via" is cumulative SIP routing information for the proxy and/or originator, and the *Proxy-Authorization(userC)* is a response to a challenge.

The proxy server 20 determines, in cooperation with an authentication server (not shown) if the host portion of the "From" header is served. If the host portion of the "From" header is served, then a further determination is made whether a proxy authorization header is present. Assuming the proxy authorization header is present, a determination is made whether the authentication credentials, either current or previously determined, from the proxy authorization header are valid. If it is determined that the authentication credentials are valid, the location server 30 validates the processing of the call, continues terminating the feature processing for routing, and authorizes the proxy server 20 to either route the call or to deny the call.

However, if the host portion of the "From" header is determined not be served by the proxy server 20 in cooperation with the authentication server, a determination is made whether the incoming call from the calling party is a billable call, e.g., a toll call or other call for which incurs a charge. If the incoming call is a billable call, a determination is made whether the calling party can be appropriately billed for that call. If an appropriate billing party can not be determined, a denial of call is sent to the calling party informing them that they are a non-trusted caller and the call can not be completed.

Alternatively, if billing information is known for the calling party, the location server 30, for example, based on a database query to a look-up table, determines if the called party accepts calls from a non-trusted calling party. If the called party accepts incoming calls from non-trusted calling parties, the location server 30 can authorize continued termination of the feature processing for routing. However, if the called party does not accept incoming calls from non-trusted calling parties, the location server 30, can forward, via for example the proxy server 20, a denial of call to the non-trusted calling party.

If the proxy server 20 determines that a proxy authorization header is not present, the proxy server 20 further determines whether the calling party is trusted. If the calling party is not-trusted the proxy server, in cooperation with the authentication server, forwards an authentication challenge to the calling party. The calling party can then re-submit another INVITE to the proxy server 20.

Alternatively, if the calling party is trusted, the location server, in cooperation with other necessary network elements, will continue processing the feature processing for routing the trusted party's call. For example, it may already be known from, for example, a trusted proxy, a terminating point, a known gateway or router, whether the calling party is trusted.

Figure 2:
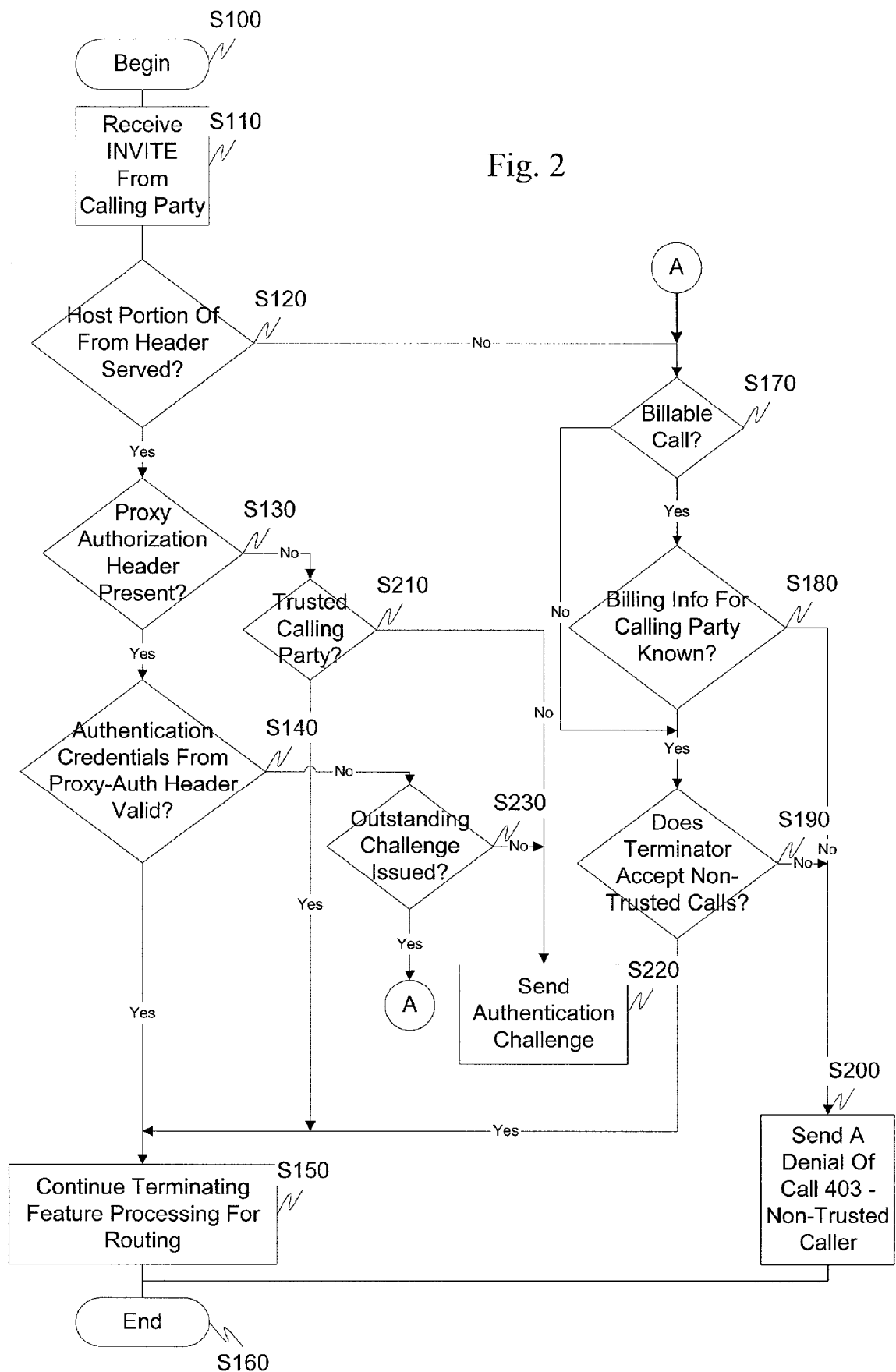
FIG. 2 is a flowchart illustrating an exemplary method for handling a non-trusted caller according to this invention.

FIG. 2 outlines the exemplary operation of the communications network. In particular, control begins in step S100 and continues to step S110. In step S110, an INVITE is received from a calling party. Next, in step S120, a determination is made whether the host portion of the "From" header is served. For example, this check can be based on a query of a database associated with a proxy server. If the host portion of the "From" header is not served, control continues to step S170. Otherwise, control jumps to step S130.

In step S170, a determination is made as to whether the calling party's call is a billable call. If the call is a billable call, control continues to step S180 where a determination is made whether billing information is available for the calling party. Otherwise, control jumps to S190.

If, in step S180, billing information for the calling party is known, control continues to step S190 where a determination is made whether the terminator accepts non-trusted calls. Additionally, if it is determined to decide to allow the call from the non-trusted user, i.e., the terminator accepts calls from non-trusted users, the proxy server can optionally attach a "Warning" header to the answer message (200 OK) that is sent to the calling party indicating that the call was placed from a non-trusted user. This is to ensure the user knows that they are considered non-trusted to the proxy server. This is important in case, for example, where the user has mis-provisioned their username and/or password, and actually should be trusted. The "Warning" header gives the user a chance to check the provisioning and correct it before placing another call. If the terminator does accept non-trusted calls, control continues to step S150. Otherwise, control jumps to step S200 where a denial of call is forwarded to the non-trusted caller. Control then continues to step S160 where the control sequence ends.

In step S130, a determination is made whether a proxy authorization header is present. If a proxy authorization header is not present, control continues to step S210. Otherwise, control jumps to step S140.

In step S210, a determination is made whether the calling party is trusted. If the calling party is trusted, control jumps to step S150. Otherwise, control continues to step S220 where an authentication challenge is forwarded to the calling party.

In step S140, a determination is made whether authentication credentials from the proxy authorization header are valid. If the authentication credentials are not valid, control continues to step S230. Otherwise, control jumps to step S150.

In step S230, a determination is made whether an outstanding challenge has been issued. If an outstanding challenge has not been issued, control continues to step S220, where an authentication challenge is forwarded to the calling party. Otherwise, control jumps to step S170 where a determination is made whether the incoming call is a billable call.

In step S150, the system continues terminating the feature processing for routing of the incoming call. Control then continues to step S160 where the control sequence ends.

As illustrated in the figures, the communications network can be implemented either on a single programmed general purpose computer, a separately programmed general purpose computer, or a combination thereof. However, the communications network can also be implemented on a special purpose computer, a programmed microprocessor or microcontroller and peripheral integrated circuit element(s), an ASIC or other integrated circuit, a digital signal processor, a hard-wired electronic or logic circuit, such as discrete element circuit, a programmable logic device, such as PLD, PLA, FPGA, PAL, or the like. In general, any device capable of implementing a state machine that is in turn capable of implementing the flowchart illustrated herein can be used to implement the communications network according this invention.

Furthermore, the disclosed method may be readily implemented in software using an object or object-oriented software development environment that provides code that can be used on a variety of computer, server or workstation hardware platforms. Alternatively, the disclosed communications network may be implemented partial or fully in hardware using standard logic circuits, or VLSI design. Whether software or hardware is used to implement the systems in accordance with this invention is dependent on the speed and/or efficiency requirements of the system, their particular function, and the particular software or hardware systems or microprocessors or microcomputer and telecommunications systems being utilized. The communications network illustrated herein, however, can be readily implemented in hardware and/or software using any known or later developed systems or structures, devices, and/or software by those of ordinary skill in the applicable art from the functional description provided herein and with a general basic knowledge of the computer and telecommunications arts.

Moreover, the disclosed methods may be readily implemented as software executed on a programmed general purpose computer, a special purpose computer, a microprocessor, or the like. In these instances, the methods and systems of the this invention can be implemented as a program embedded in a telecommunications system, such as JAVA®, or CGI script, as a resource residing on a location or proxy server, as a routine embedded in a dedicated communications network, or the like. The communications network can also be implemented by physically incorporating the system into a software and/or hardware system, such as the hardware and software system of a server and associated telecommunications management/switching device(s).

It is, therefore, apparent that there has been provided, in accordance with the present invention, systems and methods for determining whether a calling party is a trusted party. While this invention has been described in conjunction with a number of embodiments, it is evident that many alternatives, modifications and variations would be or are apparent to those of ordinary skill in the applicable arts. Accordingly, the disclosure is intended to embrace all such alternatives, modifications, equivalents and variations that are within the spirit and scope of this invention.

The invention claimed is:

1. A method comprising:
   receiving a first request to initiate a call from a calling party;
   sending, in response to receiving the first request, a response to the calling party that includes first information;
   receiving a second request from the calling party that includes second information that is based on the first information;
   determining whether the second request is from a trusted calling party by operating on the second information;
   processing the second request to route the call to a called party when the second request is determined to be from a trusted party; and
   determining whether the called party accepts non-trusted calls when the second request is not determined to be from a trusted party.

2. The method of claim 1, further comprising forwarding a denial of call message when the called party does not accept non-trusted calls.

3. The method of claim 1, further comprising:
   determining if the call is billable when the second request is received from a non-trusted calling party.

4. The method of claim 3, further comprising determining whether billing information is available when the call is from the non-trusted calling party.

5. The method of claim 1, wherein the first information includes a seed that is to be used in an authentication algorithm; and
   wherein the second information includes a result of the seed being used in the authentication algorithm.

6. The method of claim 1, further comprising determining whether one or more authentication credentials are valid.

7. The method of claim 1, wherein at least a portion of the call is over a session initiation protocol based network.

8. A system comprising:
   means for receiving a session initiation protocol (SIP) request to initiate a call from a calling party;
   means for responding to the request, the response including first information;
   means for determining whether the calling party is a trusted calling party based on another request from the calling party that includes second information, the second information being based on the first information;
   means for processing the other request to route the call to a called party when the other request is determined to be from a trusted calling party; and
   means for determining whether the called party accepts non-trusted calls when the other request is determined to be from a non-trusted calling party.

9. The system of claim 8, further comprising means for forwarding a denial of call message when the called party does not accept non-trusted calls.

10. The system of claim 8, further comprising means for determining if the call is billable when the other request is from a non-trusted calling party.

11. The system of claim 10, further comprising means for determining whether billing information is available for the non-trusted calling party when the calling party is the non-trusted calling party.

12. The system of claim 8, wherein the means for responding further comprises means for sending a seed to the calling party.

13. The system of claim 8, wherein the means for responding comprises:
    means for determining whether one or more authentication credentials are valid.

14. The system of claim 8, wherein the calling party is a SIP client.

15. A computer-readable memory device encoded with instructions capable of being executed by a computer, the computer-readable memory device comprising:
    instructions for receiving a request to initiate a call from a calling party;
    instructions for sending a response to the calling party, the response requesting authentication information from the calling party;
    instructions for receiving a subsequent request from the calling party, the subsequent request including the authentication information;
    instructions for determining whether the subsequent request is from a trusted calling party based on the authentication information;
    instructions for processing the request to route the call to a called party when the subsequent request is determined to be from a trusted calling party; and
    instructions for determining whether the called party accepts calls from non-trusted calling parties when the subsequent request is determined to be from a non-trusted calling party.

16. The computer-readable memory device of claim 15, further comprising instructions for forwarding a denial of call message when the called party does not accept non-trusted calling parties.

17. The computer-readable memory device of claim 15, further comprising instructions for determining if the call is billable when the request is from a non-trusted calling party.

18. The computer-readable memory device of claim 17, further comprising instructions for determining whether billing information is available for the non-trusted calling party when the calling party is the non-trusted calling party.

19. The computer-readable memory device of claim 15, further comprising instructions for sending a seed in the response to the calling party.

20. The computer-readable memory device of claim 15, further comprising instructions for determining whether one or more authentication credentials are valid.

21. The computer-readable memory device of claim 15, wherein the calling party is a SIP client.

22. A system comprising:
a proxy server configured to:
  receive a request to initiate a call from a calling party, and
  send a challenge;
an authorization server configured to:
  determine whether the request is from a trusted calling party based on authentication information received from the calling party in response to the challenge; and
a location server configured to:
  process the request to route the call to a called party when the authorization server determines that the request is from a trusted calling party, and
  determine whether the called party accepts calls from non-trusted calling parties when the authorization server determines that the request is from a non-trusted calling party.

23. A method comprising:
receiving, via a proxy server, a request to initiate a call from a calling party, where the request includes a header that identifies a host with which the calling party is associated;
determining, in response to receiving the request, whether the identified host is served by the proxy server;
determining whether a proxy authorization is present in the header of the request when the identified host is determined to be served by the proxy server;
processing the request to route the call to a called party when the proxy authorization is present in the header of the request and the proxy authorization is valid;
determining whether the calling party is a trusted party when a proxy authorization is determined to not be present in the header of the request;
processing the request to route the call to the called party when the calling party is determined to be a trusted party; and
sending an authentication challenge to the calling party when the calling party is determined to be a non-trusted party.

24. The method of claim 23, further comprising:
determining whether the call is billable when the identified host is determined not to be served by the proxy server;
determining whether billing information for the calling party is known when the call is determined to be billable;
determining whether the called party accepts non-trusted calls when the call is determined to not be billable or when the billing information is known for the party;
denying the received request when the called party is determined to not accept non-trusted calls or when the billing information is not known for the party; and
processing the request to route the call to the called party when the called party is determined to accept non-trusted calls.

25. The method of claim 23, further comprising:
receiving a second invitation request to initiate a call from the calling party in response to sending the authentication challenge.

* * * * *